Patented Apr. 12, 1932

1,854,141

UNITED STATES PATENT OFFICE

GEORGE FREDERICK HORSLEY, OF NORTON-ON-TEES, ENGLAND, ASSIGNOR TO IMPERIAL CHEMICAL INDUSTRIES LIMITED, OF LONDON, ENGLAND, A BRITISH COMPANY

REMOVAL OF ACETYLENE FROM GASES

No Drawing. Application filed May 9, 1930, Serial No. 451,210, and in Great Britain May 24, 1929.

This invention relates to a process for the removal of acetylene from gases containing it by means of a solvent for acetylene. The absorption of acetylene in acetone is well known and it has also been proposed to use acetonitrile as a washing agent for gases containing acetylene. Both these solvents have the disadvantage of being easily vaporized so that the subsequent separation of acetylene from the solvent by distillation presents certain difficulties and it becomes necessary to undertake further operations to remove the entrained vapours of solvent from the final product.

According to my invention I employ an ether or ester of high boiling point as an absorbent for the removal of acetylene from gases containing it. Preferably I employ esters, ethers and mixed ester-ethers of polyhydric alcohols as solvents.

It may be pointed out here that the ideal solvent for the purpose of recovering acetylene from gases would possess the following properties.

1. High solubility for acetylene with low solubility for other gases.
2. High boiling point and low vapour pressure at ordinary temperatures.
3. Low viscosity in order to ensure efficient wetting of the packing in an absorption tower.
4. Stability at the boiling point.
5. No chemical reaction with acetylene or other gases such as methane or olefines, etc.

The following compounds have been successfully employed:—

Glycol mono-formate, glycol mono- and di-alkyl ethers (e. g. glycol mono-methyl, ethyl and propyl, glycol di-methyl, di-ethyl and di-propyl ethers) and the esters of the mono-alkyl ethers of ethylene glycol, e. g. the acetate of the mono-ethyl ether of ethylene glycol.

In addition, glycerol derivatives of an entirely similar nature are efficient to a similar degree, e. g. glycerol mono- and di-acetates, mono-, di-, and tri-alkyl ethers of glycerol (e. g. glycerol mono-, di-, and tri-ethyl ethers) and the esters of the mono-alkyl or di-alkyl ethers of glycerol (e. g. the esters of the diethyl ether of glycerol).

Esters of high boiling point of other alcohols may also be employed, e. g. phthalates or ethyl lactate.

According to the invention gases containing acetylene are brought into contact in any desired manner, and at a suitable temperature, preferably cooled, and with or without pressure, with one or more of these solvents. The acetylene is absorbed and may be recovered by heating and/or reducing the pressure on the solvent.

The results of experiments with solvents of the above type are given below. The gas was passed up a packed tower 4 ft. 6 ins. in height having a surface area of 6.9 sq. ft. The solvent, which was glycerol triacetate in Example 1, glycol diacetate in Example 2 and the acetate of the mono-ethyl ether of ethylene glycol in Example 3, was kept at 20° C. during the absorption and the gas was expelled by boiling.

| Constituent | Example 1 | | | Example 2 | | | Example 3 | |
|---|---|---|---|---|---|---|---|---|
| | Inlet gas | Exit gas | Recovered gas | Inlet gas | Exit gas | Recovered gas | Inlet gas | Recovered gas |
| $CO_2$ | 0.6 | 0.6 | 1.8 | 1.7 | 0.8 | 4.0 | | |
| $C_2H_2$ | 26.4 | 3.25 | 89.6 | 25.0 | 4.3 | 86.6 | 10 | 84 |
| $C_nH_{2n}$ | 1.2 | 1.3 | 1.2 | 1.1 | 0.5 | 0.2 | | |
| $O_2$ | 1.6 | Not determined. | 0.4 | 1.4 | 1.6 | 0.4 | | |
| CO | 6.2 | | 1.2 | 6.2 | 7.4 | 1.0 | | |
| $H_2$ | 26.4 | | 0.6 | 25.8 | 35.2 | Nil. | | |
| $CH_4$ | 21.9 | | 5.0 | 22.0 | 27.6 | 7.8 | | 85 |
| $N_2$ by difference | 16.7 | | 0.2 | 16.8 | 22.6 | Nil. | | |
| | Gas rate 10 litres per hour. | | | Solvent rate 3 litres per hour. | | | Gas rate 20 litres per hour. Solvent rate 1.5 litres per hour | |

I declare that what I claim is:—

1. Process of recovery of acetylene from gases containing same which includes the step of scrubbing said gases with an ester of a polyhydric alcohol.

2. Process of recovery of acetylene from gases containing the same, which includes the step of scrubbing said gases with a nonvolatile ether.

3. Process of recovery of acetylene from gases containing the same, which includes the step of scrubbing said gases with an ether of a polyhydric alcohol.

4. Process of recovery of acetylene from gases containing the same, which includes the step of scrubbing said gases with a mixed esther-ether of a polyhydric alcohol.

In witness whereof, I have hereunto signed my name this 28th day of April, 1930.

GEORGE FREDERICK HORSLEY.